US006761215B2

(12) United States Patent
Morrison et al.

(10) Patent No.: US 6,761,215 B2
(45) Date of Patent: Jul. 13, 2004

(54) DOWNHOLE SEPARATOR AND METHOD

(76) Inventors: James Eric Morrison, 3407 Foothills Blvd., Gillette, WY (US) 82716; Guy Morrison, III, 1600 S. Garner Lake Rd., Gillette, WY (US) 82718

( * ) Notice: Subject to any disclaimer, the term of this patent is extended or adjusted under 35 U.S.C. 154(b) by 25 days.

(21) Appl. No.: 10/236,348

(22) Filed: Sep. 6, 2002

(65) Prior Publication Data

US 2004/0045708 A1 Mar. 11, 2004

(51) Int. Cl.$^7$ .............................................. E21B 43/00
(52) U.S. Cl. ...................... 166/105.5; 166/265; 96/214; 96/217
(58) Field of Search ....................... 166/54.1, 68, 105.1, 166/105.3, 105.4, 265, 325

(56) References Cited

U.S. PATENT DOCUMENTS

| | | | |
|---|---|---|---|
| 5,673,752 A | 10/1997 | Scudder et al. | |
| 5,762,149 A | * 6/1998 | Donovan et al. | ............. 175/40 |
| 6,036,749 A | 3/2000 | Ribeiro et al. | |
| 6,066,193 A | 5/2000 | Lee | |
| 6,155,345 A | 12/2000 | Lee et al. | |
| 6,250,384 B1 | * 6/2001 | Beauquin | ................. 166/105.5 |
| 6,382,317 B1 | 5/2002 | Cobb | |
| 6,394,183 B1 | * 5/2002 | Schrenkel et al. | .......... 166/265 |

FOREIGN PATENT DOCUMENTS

| | | | |
|---|---|---|---|
| EP | 0088850 | * | 7/1986 |
| WO | WO93/09875 | * | 5/1993 |

* cited by examiner

Primary Examiner—Frank Tsay
(74) Attorney, Agent, or Firm—Ancel W. Lewis, Jr.

(57) ABSTRACT

A downhole separator has a housing defining an interior cavity divided into a first chamber and a second chamber by a flow restricting bearing housing. A shaft driven impeller pumps production fluid into the first chamber and to the bearing housing. The bearing housing generates a pressure drop in production fluid entering the second chamber, separating gas from liquid. A vortex generator in the second chamber segregates the liquid to the outside and the gas to the inside of the second chamber. A downhole separation method includes pumping production fluid into a first chamber, and generating a pressure drop in the fluid as the fluid enters a second chamber to separate gas and liquid.

17 Claims, 2 Drawing Sheets

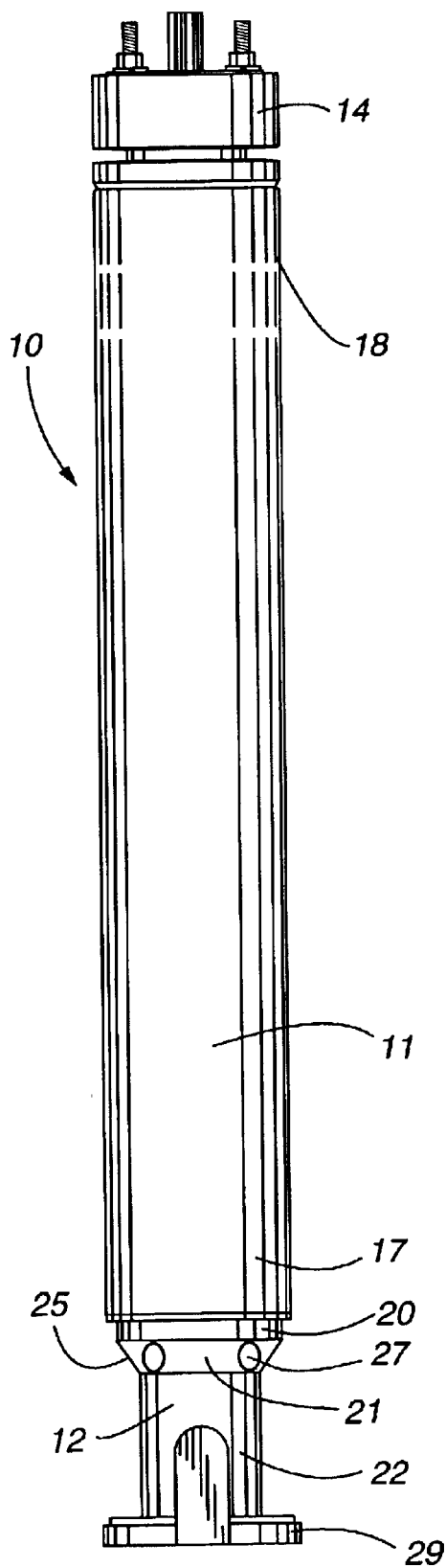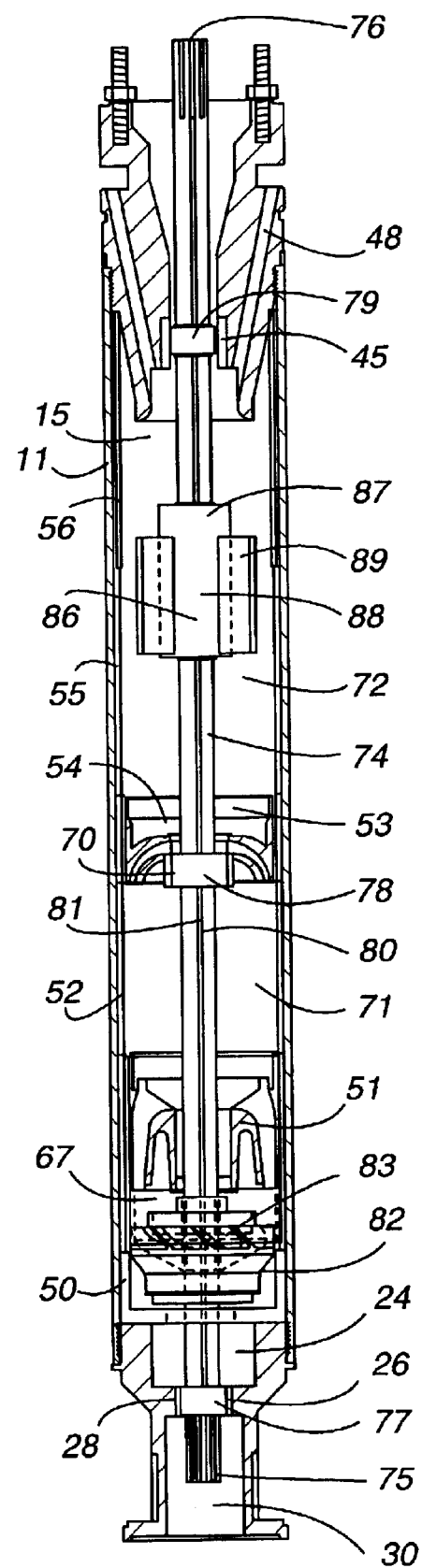

DOWNHOLE SEPARATOR AND METHOD

TECHNICAL FIELD

The present invention relates to separators for oil and gas wells, and more particularly to a rotary, downhole, gas and liquid separator and a downhole method of separating gas and liquid from production fluid.

BACKGROUND ART

Liquids are substantially incompressible fluids while gases are compressible fluids. The production fluid in an oil or gas well is generally a combination of liquids and gases. In particular, the production fluid for methane production from coal formation includes the gas and water. Pumping such production fluid is difficult due to the compressibility of the gas. Compression of the gas reduces the efficiency of the pump and the pump can cavitate, stopping fluid flow. Downhole gas and liquid separators separate the gas and liquid in the production fluid at the bottom of the production string, before pumping the liquid up the production string, and thereby improve the efficiency and reliability of the pumping process. In some cases, the waste fluids from the production fluid may be reinjected above or below the production formation, eliminating the cost of bringing such waste fluids to the surface and the cost of disposal or recycling.

U.S. Pat. No. 5,673,752 to Scudder et al. discloses a separator that uses a hydrophobic membrane for separation. U.S. Pat. No. 6,036,749 to Ribeiro et al., U.S. Pat. No. 6,066,193 to Lee and U.S. Pat. No. 6,382,317 to Cobb disclose powered rotary separators. U.S. Pat. No. 6,155,345 to Lee et al. discloses a separator divided by flow-through bearings into multiple separation chambers.

DISCLOSURE OF THE INVENTION

A downhole separator includes a housing defining an interior cavity, a means for restricting fluid flow, an internal pump and a vortex generator. The means for restricting fluid flow is located in the housing and divides the interior cavity into a first chamber and a second chamber. The internal pump pumps production fluid into the first chamber and through the means for restricting flow. The means for restricting flow generates a pressure drop in production fluid entering the second chamber, causing the gas and liquid to separate. The vortex generator segregates the liquid to the outside and gas to the inside of the second chamber. The method of separating liquid and gas from production fluid includes pumping production fluid into a first chamber, generating a pressure drop in the production fluid as the production fluid flows from the first chamber into a second chamber, and generating a vortex in the production fluid in the second chamber.

BRIEF DESCRIPTION OF THE DRAWINGS

Details of this invention are described in connection with the accompanying drawings that bear similar reference numerals in which:

FIG. 1 is a side elevation view of a separator embodying features of the present invention.

FIG. 2 is a side cut away view of the separator of FIG. 1.

DETAILED DESCRIPTION OF THE INVENTION

Figure 3:
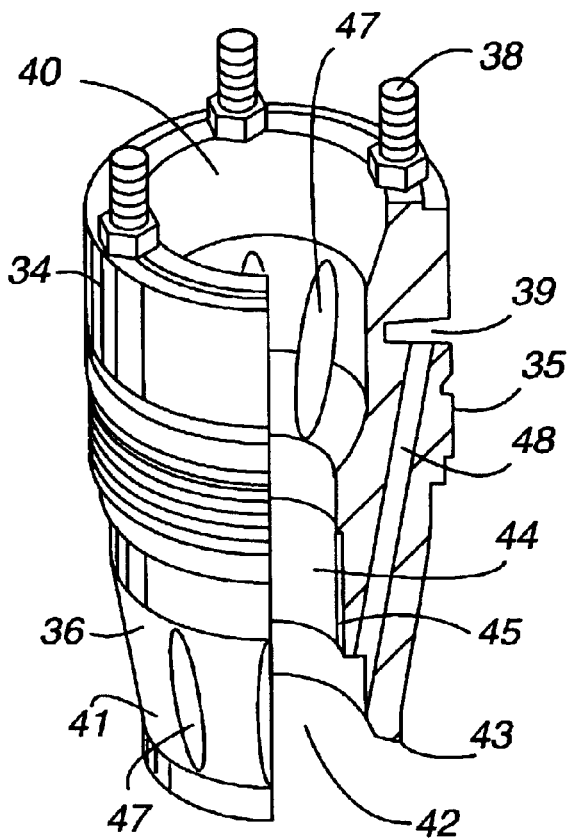
FIG. 3 is a partially cut away view of the head of the separator of FIG. 1.

Referring now to FIGS. 1 and 2, a separator 10 embodying features of the present invention includes a housing 11, a base 12, and a head 14. The housing 11 is a hollow, elongated, cylinder defining an interior cavity 15. The separator housing 11 has spaced, internally threaded lower and upper ends 17 and 18.

Describing the specific embodiments herein chosen for illustrating the invention, certain terminology is used which will be recognized as being employed for convenience and having no limiting significance. For example, the terms "top", "bottom", "up" and "down" will refer to the illustrated embodiment in its normal position of use. "Inward" and "outward" refer to radially inward and radially outward, respectively, relative to the axis of the illustrated embodiment of the device. Further, all of the terminology above-defined includes derivatives of the word specifically mentioned and words of similar import.

The base 12 has an upper portion 20, an intermediate portion 21 and a lower portion 22. The upper portion 20 is an externally threaded, hollow, cylinder sized and shaped to thread into the lower end 17 of separator housing 11, and includes an upwardly opening, centered, generally cylindrical upper cavity 24. The intermediate portion 21 has an exterior surface 25 that, in the illustrated embodiment, extends downwardly and inwardly from the upper portion 20 and has a centered lower bearing aperture 26 extending downward from the upper cavity 24. A lower bearing 28 is mounted in the lower bearing aperture 26. A plurality of circumferentially arranged inlet ports 27 extend from the exterior surface 25 upwardly and inwardly into the upper cavity 24. The lower portion 22 is hollow and generally cylindrical, and extends downward from the intermediate portion 21 to an outwardly projecting flange 29, with a lower cavity 30 extending from the lower bearing aperture 26.

Referring to FIG. 3, the head 14 includes an upper portion 34, an intermediate portion 35 extending downward from the upper portion 34, and a lower portion 36 extending downward from the intermediate portion 35. The upper portion 34 is generally cylindrical and includes a plurality of spaced, radially arranged, upwardly extending, threaded studs 38. An external, circumferential channel 39 extends around the head 14 between the upper portion 34 and the intermediate portion 35. The intermediate portion 35 is externally threaded, and sized and shaped to thread into the upper end 18 of the separator housing 11. An upwardly opening, inwardly and downwardly tapering, generally conical upper cavity 40 extends through the upper portion 34 and the intermediate portion 35.

The lower portion 36 has a downwardly and inwardly tapering exterior surface 41, and a downwardly opening, downwardly and outwardly tapering lower cavity 42 that connects to the exterior surface 41 at a lower end 43. An upper bearing aperture 44 extends between the upper cavity 40 and the lower cavity 43, and has an upper bearing 45 mounted therein. A plurality of circumferentially arranged liquid outlet ports 47 extend upwardly and inwardly from the exterior surface 41 to the upper cavity 40. A plurality of circumferentially arranged gas outlet ports 48 extend upwardly and outwardly from the lower cavity 42 to the channel 39.

Referring again to FIG. 2, the separator 10 includes a lower diffuser 50, an upper diffuser 51, a first sleeve 52, a means for restricting flow 53, a second sleeve 55 and a third sleeve 56, with each having a cylindrical exterior sized and shaped to fit into the interior cavity 15 of the separator housing 11, and with each being assembled into the interior cavity 15 in the above listed order from the base 12 to the head 14. In the illustrated embodiment the means for restricting fluid flow 53 is a bearing housing 54. Other means for restricting fluid flow 53 are suitable for the present invention.

Figure 5:
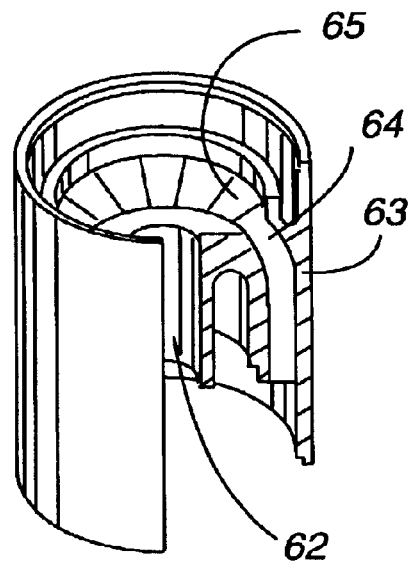
FIG. 5 is a partially cut away view of the upper diffuser of the separator of FIG. 1.
Figure 4:
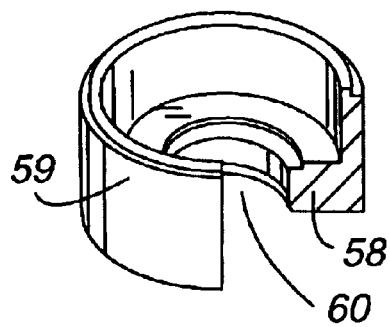
FIG. 4 is a partially cut away view of the lower diffuser of the separator of FIG. 1.

As shown in FIG. 4, the lower diffuser 50 is substantially cup shaped with a generally flat round bottom 58, an outer wall 59 extending upward from the periphery of the bottom 58, and a lower diffuser aperture 60 extending through the center of the bottom 58. Referring to FIG. 5, the upper diffuser 51 includes an upper diffuser aperture 62 extending upwardly through the center of upper diffuser 51, a cylindrical outer wall 63, and a plurality of spaced, radially arranged, upwardly, inwardly and helically extending passages 64 between upper diffuser aperture 62 and the outer wall 63, with passages 64 being separated by radial fins 65. The outer wall 59 of the lower diffuser 50 extends upwardly and the outer wall 63 of the upper diffuser 51 extends downwardly to space the lower and upper diffusers 51 and 52 apart to define an impeller cavity 67 therebetween.

Figure 6:
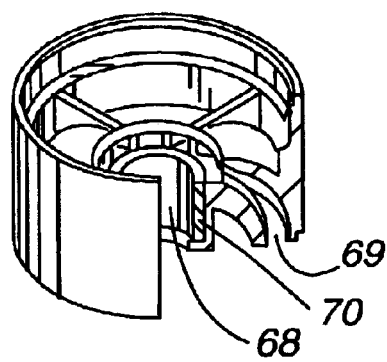
FIG. 6 is a partially cut away view of the bearing housing of the separator of FIG. 1.

The bearing housing 54, as shown in FIG. 6, is generally cylindrical with an intermediate bearing aperture 68 and a plurality of spaced, radially arranged passages 69 extending through the bearing housing 54. An intermediate bearing 70 is mounted in the intermediate bearing aperture 68. Passages 69 are configured to restrict fluid flow so that bearing housing 54 divides the interior cavity 15 into a first chamber 71 and a second chamber 72. In the illustrated embodiment the passages 69 extend upwardly, inwardly and helically, so that the passages 69 initiate vortex generation in the production fluid as the production fluid flows into the second chamber 72. Referring back to FIG. 2, the first, second and third sleeves 53, 55 and 56 are each relatively thin walled hollow cylinders. The first sleeve 52 spaces the bearing housing 54 from the upper diffuser 51. The second and third sleeves 55 and 56 together space the bearing housing 54 from the head 14.

Figure 7:
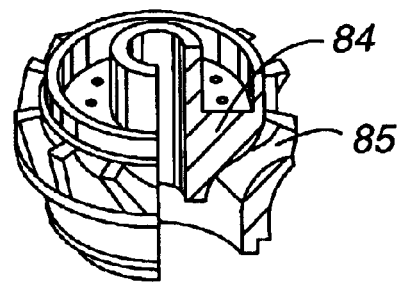
FIG. 7 is a partially cut away view of the impeller of the separator of FIG. 1.

An elongated cylindrical shaft 74 extends through the interior cavity 15 with a splined lower end 75 extending into the lower cavity 30 of the base 12 and a spaced, splined upper end 76 extending into the upper cavity 40 of the head 14. Lower, intermediate and upper bearing journals 77, 78 and 79 are sized and spaced along the shaft 74 to fit the lower, intermediate and upper bearings 28, 70 and 45, respectively. A keyway 80 extends longitudinally along shaft 74 with a key 81 mounted therein. An internal pump 82 mounts on the shaft 74. Internal pump 82 is shown in the illustrated embodiment in FIG. 7 as impeller 83, in the impeller cavity 67, having a hub 84 on shaft 74 secured by key 81 and a plurality of spaced, radially arranged, upwardly, outwardly and helically extending passages 85 around the hub 84. Other styles of internal pump 82, such as an auger pump, are suitable. A vortex generator 86 is shown in FIG. 2 as a paddle assembly 87 positioned in the second chamber 72 and having a hub 88 on shaft 74 secured by key 81 and a plurality of spaced vertical paddles 89 that extend radially from the hub 88. Other styles of vortex generator, such as spiral or propeller, are also suitable.

In a typical installation of the separator 10 mounts between a motor on the flange 29 of the base 12 and a well pump secured to the head 14 by the studs 38. The impeller 83 pulls production fluid into the first chamber 71 of the separator 10 through the inlet ports 27 and lower diffuser 50 and pumps the production fluid into the upper diffuser 51. The upper diffuser 51 directs production fluid up to the bearing housing 54.

The passages 69 restrict the flow of production fluid through the bearing housing 54 between the first and second chambers 71 and 72, generating a pressure drop and rapid expansion of the production fluid enter the second chamber 72. The rapid expansion of the production fluid causes gas in the production fluid to expand and separate from liquid in the production fluid. From the bearing housing 54 the liquid and gas travel upward to the vortex generator 87. The paddles 89 push the liquid and gas in a circular direction and thereby centrifugally segregate the liquid at the outside and the gas at the inside of the second chamber 72. The liquid passes upwardly to the liquid outlet ports 47 and into the well pump. Gas passes upwardly to the gas outlet ports 48 and out of the separator 10 at the channel 39.

A method of separating gas and liquid from production fluid in a well, embodying features of the present invention, includes providing connected first and second chambers, pumping production fluid into the first chamber, generating a pressure drop in the production fluid as the fluid passes between the first and second chamber, and generating a vortex in the second chamber. More particularly, the first step of the method includes providing connected first and second chambers, a bearing housing between the first and second chambers, a rotary paddle in the second chamber, and gas outlet ports and liquid outlet ports connected to the second chamber, with the bearing housing having a plurality of restrictive passages extending helically between the first and second chambers. The next step includes pumping the production fluid into the first chamber. The next step includes passing said the production fluid through the passages to generate a pressure drop in said production fluid as the production fluid flows into the second chamber to separate the gas and the liquid. Passing the production fluid through the passages also imparts a helical flow to the production fluid and thereby initiates generation of a vortex. The next step includes rotating the paddle to continue vortex generation to further separate the gas and the liquid. The gas is then diverted out of the second chamber through the gas outlet ports, and the liquid is diverted out of the second chamber through the liquid outlet ports.

Although the present invention has been described with a certain degree of particularity, it is understood that the present disclosure has been made by way of example and that changes in details of structure may be made without departing from the spirit thereof.

What is claimed is:

1. A downhole gas and liquid separator for a well comprising:
   first and second chambers,
   an internal pump for pumping production fluid through said first chamber, and into said second chamber,
   means, positioned a between said first and second chambers, for restricting fluid flow to generate a pressure drop in said production fluid and to separate gas and liquid as said production fluid enters said second chamber, and
   a vortex generator in said second chamber to centrifugally separate said fluid into gas and liquid.

2. The separator as set forth in claim 1 including a driven rotary shaft extending through said first and second chambers.

3. The separator as set forth in claim 2 wherein said vortex generator is a paddle on said shaft.

4. The separator as set forth in claim 2 wherein said pump is an impeller on said shaft.

5. The separator as set forth in claim 4 including an upper diffuser between said impeller and said means for restricting fluid flow that directs said production fluid from said impeller toward said means for restricting fluid flow.

6. The separator as set forth in claim 2 wherein said means for restricting fluid flow is a bearing housing that has a bearing that stabilizes said shaft.

7. The separator as set forth in claim 6 wherein said bearing housing has a plurality diagonally extending passages between said first and second chambers that restrict fluid flow and propel said production fluid into said second chamber in a diagonal direction, and thereby initiate vortex generation.

8. The separator as set forth in claim 1 including an elongated housing having a first and second end, a base and a head, said housing containing said first chamber near said first end and said second chamber near said second end, said base attaching to said first end and including inlet ports connecting to said first chamber, and said head attaching to said second end and including gas and liquid outlet ports connecting to said second chamber.

9. A downhole gas and liquid separator for a well comprising:
an elongated housing having a first and second end, said housing containing a first chamber near said first end and a second chamber near said second end,
a base, attached to said first end, having inlet ports connecting to said first chamber,
a head, attached to said second end, having gas and liquid outlet ports connecting to said second chamber,
a driven rotary shaft extending through said base, said first chamber, said second chamber, and said head,
an impeller on said shaft in said first chamber for pumping production fluid through said first chamber, and into said second chamber,
a fluid flow restricting bearing housing, positioned between said first and second chambers, for restricting fluid flow to generate a pressure drop in said production fluid and to separate gas and liquid as said production fluid enters said second chamber, and
a paddle on said shaft in said second chamber to centrifugally separate said fluid into gas and liquid.

10. A method of separating gas and liquid from production fluid in a well comprising the steps of:
providing connected first and second chambers,
pumping said production fluid into said first chamber,
generating a pressure drop in said production fluid as said production fluid flows from said first chamber to said second chamber, to separate said gas and said liquid, and
generating a vortex in said second chamber, to further separate said gas and said liquid.

11. The method as set forth in claim 10 wherein said step of providing first and second chambers includes locating said first and second chambers downhole.

12. The method as set forth in claim 10 wherein said step of generating a pressure drop includes the step of restricting flow of said production fluid between said first and second chambers.

13. The method as set forth in claim 12 wherein said step of restricting flow of said production fluid includes providing a bearing housing between said first and second chambers with said bearing housing having a plurality of restrictive passages extending between said first and second chambers, and passing said production fluid through said passages.

14. The method as set forth in claim 13 wherein said passages of said bearing housing are helically extending and said passing said production fluid through said passages initiates said step of generating a vortex.

15. The method as set forth in claim 10 wherein said step of generating a vortex includes providing a rotary paddle and rotating said paddle.

16. The method as set forth in claim 10 including the steps of providing gas outlet ports and liquid outlet ports connected to said second chamber, diverting said gas out of said second chamber through said gas outlet ports and diverting said liquid out of said second chamber through said liquid outlet ports.

17. A method of separating gas and liquid from production fluid in a well comprising the steps of:
providing connected first and second chambers, a bearing housing between said first and second chambers, a rotary paddle in said second chamber, and gas outlet ports and liquid outlet ports connected to said second chamber, said bearing housing having a plurality of restrictive passages extending helically between said first and second chambers,
pumping said production fluid into said first chamber,
passing said production fluid through said passages with said passing generating a pressure drop in said production fluid as said production fluid flows from said first chamber to said second chamber and said pressure drop separating said gas and said liquid, and with said passing imparting a helical flow to said production fluid and thereby initiating generation of a vortex,
rotating said paddle and thereby continuing generation of said vortex in said second chamber, to further separate said gas and said liquid,
diverting said gas out of said second chamber through said gas outlet ports, and
diverting said liquid out of said second chamber through said liquid outlet ports.

* * * * *